United States Patent [19]

Masliah et al.

[11] 4,151,527
[45] Apr. 24, 1979

[54] PROCESS AND APPARATUS FOR THE DETECTION OF OBJECTS, ESPECIALLY OF OBJECTS HAVING A VERY SMALL EQUIVALENT SURFACE AREA

[75] Inventors: Leon Masliah, Vaucresson; Jean F. Morand, Paris, both of France

[73] Assignee: Electronique Marcel Dassault, Paris, France

[21] Appl. No.: 776,543

[22] Filed: Mar. 11, 1977

[30] Foreign Application Priority Data

Mar. 12, 1976 [FR] France ................................ 76 07215

[51] Int. Cl.$^2$ .............................................. G01S 9/24
[52] U.S. Cl. ................................ 343/7.5; 343/5 SA; 343/17.5
[58] Field of Search ...................... 343/5 SA, 7.5, 17.5

[56] References Cited

U.S. PATENT DOCUMENTS

| | | | |
|---|---|---|---|
| 3,110,897 | 11/1963 | Laurent | 343/17.5 X |
| 3,381,292 | 4/1968 | Hansen | 343/17.5 |
| 3,603,995 | 9/1971 | Howard | 343/17.2 R X |
| 3,716,823 | 2/1973 | Thompson et al. | 343/5 SA X |
| 3,772,689 | 11/1973 | Root, Jr. | 343/5 SA X |

OTHER PUBLICATIONS

F. E. Nathanson, *Frequency Agility for Radar Target Detection and Tracking*, APL Technical Digest, vol. 9, No. 6, Jul.-Aug. 1970, pp. 2-8.

*Primary Examiner*—T. H. Tubbesing
*Attorney, Agent, or Firm*—Hane, Roberts, Spiecens & Cohen

[57] ABSTRACT

A process and apparatus for the detection of an object in air, wherein a beam of electromagnetic radiation is emitted, the reflected beam is received, the frequency of the reflected beam being varied discontinuously over a frequency band. The amplitude of the energy of the beam received for the various frequencies of the emitted beam is measured so as to utilize, for the detection of the object, the particular frequency or frequencies of the beam for which the reflected beam possesses a substantially higher energy than the energy of the beam reflected at the other frequencies.

5 Claims, 3 Drawing Figures

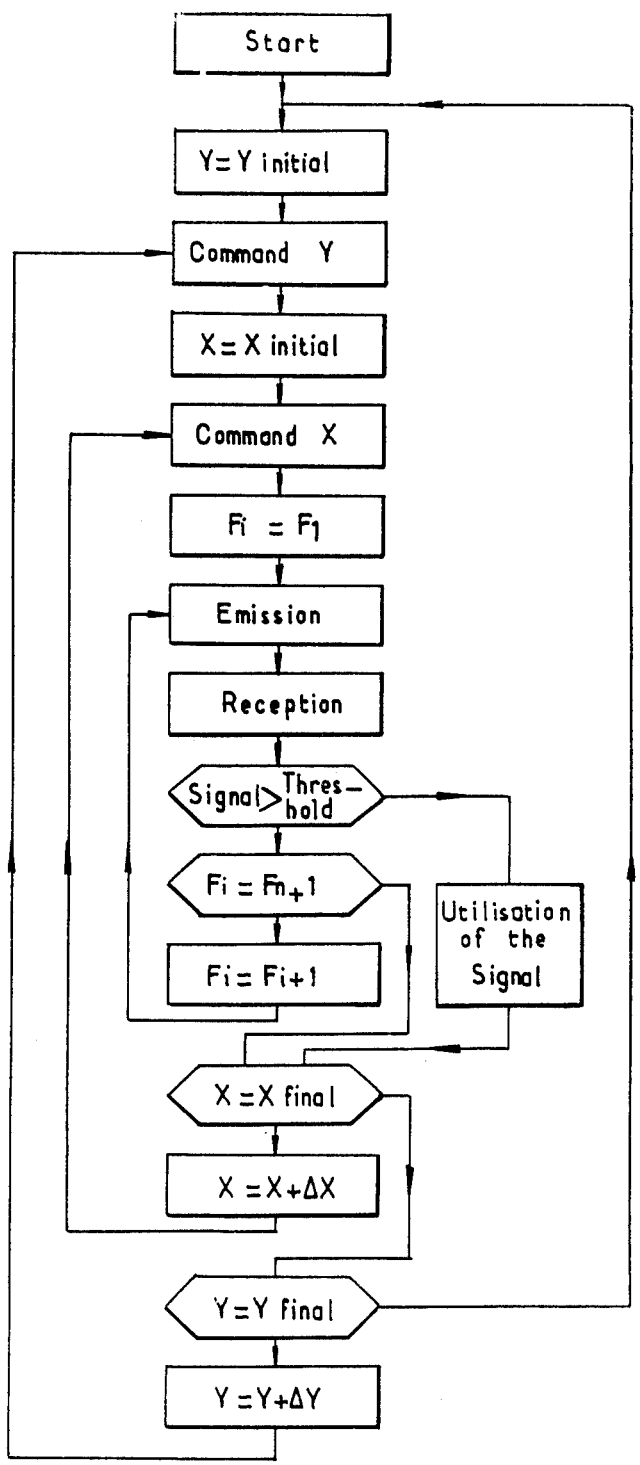

PROCESS AND APPARATUS FOR THE DETECTION OF OBJECTS, ESPECIALLY OF OBJECTS HAVING A VERY SMALL EQUIVALENT SURFACE AREA

FIELD OF THE INVENTION

The invention relates to a process and an apparatus for the detection objects, especially of objects having a very small surface area.

BACKGROUND

The detection, by electromagnetic radiation, of objects having a small surface area demands high-power systems, the large size and large weight of which are obstacles to their use, especially for equipment carried on aircraft, missiles or naval craft.

SUMMARY OF THE INVENTION

It is, an object of the invention to provide a process and an apparatus which make it possible to detect objects, especially objects of small or very small surface area, under much better conditions than those currently known for the usual processes and apparatus.

In this context it is an object of the invention to provide a process and an apparatus, which for a given distance and a given sensitivity, make it possible to detect an object as satisfactorily as with the known processes and apparatus but by means of systems of markedly smaller size, power, weight and bulk than those of the known systems.

The process according to the invention, for the detection of an object by means of a beam of electromagnetic radiation produced by an emitter and reflected by the said object, is characterized in that in the course of searching for an object by means of the said beam, the frequency of the latter is controlled so that it discontinuously scans a broad band.

According to another characteristic of the invention, the band or range of frequencies scanned is explored by breaking up this range into n steps of frequencies the size of each step being smaller than a predetermined value, the scanning being carried out in steps of increasing frequency or decreasing frequency or in any desired sequence.

An apparatus for carrying out the process according to the invention comprises a generator of a beam of electromagnetic radiation and a receiver for the beam reflected by a detected object, means being associated with the generator so that the frequency of the said beam scans discontinuously a broad range of frequencies.

The invention is based on the surprising discovery made by the Applicant that for a given object illuminated by a beam of electromagnetic radiation of variable frequency, the energy reflected by the said object exhibits a substantially larger amplitude, for certain directions and certain frequencies, than that reflected in other directions and for other frequencies.

The resulting considerable increase in the apparent reflecting surface area of an object, of the order of several hundred-fold, makes it possible to detect an object with systems of markedly smaller dimensions, power, weight and bulk than those of the known systems.

BRIEF DESCRIPTION OF THE DRAWING

The invention will be better understood from the description which follows, which is given by way of example and with reference to the attached drawings in which:

FIG. 3 illustrates the mode of operation of a logic circuit of the apparatus according to the invention.

DETAILED DESCRIPTION

Figure 1:
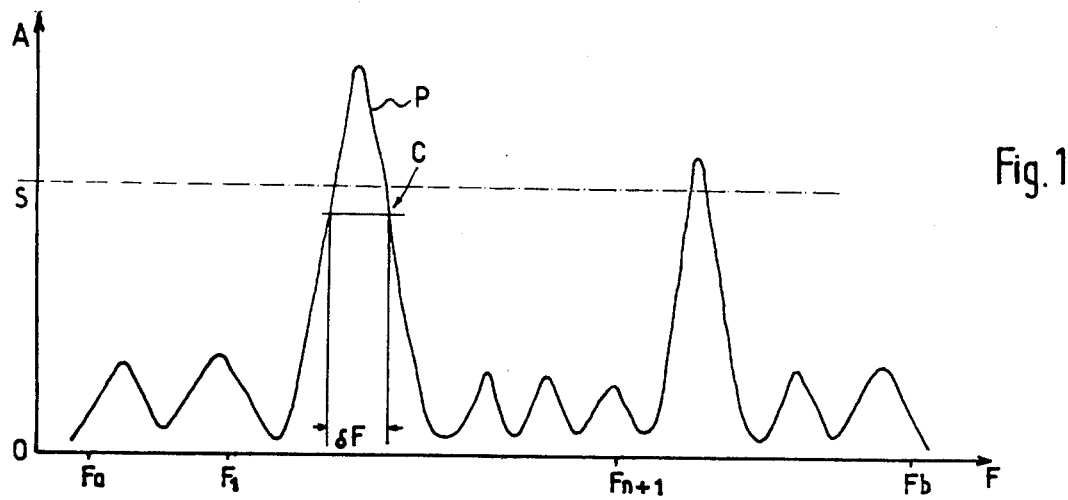
FIG. 1 is a graph showing the amplitude of reflected wave energy as a function of the frequency of incident wave energy.

If an object is illuminated by a beam of electromagnetic radiation it reflects the incident energy both in the direction of the radiation emitter and in other directions in space. Experiments carried out by the Applicant have shown, surprisingly, that for a given object, all other aspects being the same, the energy radiated by the object in the direction of the incident beam exhibited, in a stable manner, considerably higher values for certain frequencies of the said beam than for the other frequencies. This phenomenon, which results firstly from the summation of the in-phase elementary energies reflected by different parts of the object and, secondly, from the existence of parts of the object which play the role of catadiopters, manifests itself in a profound modulation of the amplitude of the energy reflected by the object in the direction of the incident illuminating beam, as is shown by curve C of FIG. 1, in which the frequencies of the incident beam have been plotted on the abscissa and the amplitude of the energy reflected by the object in the direction of the said beam have been plotted on the ordinate.

The shape of the curve C depends on the object illuminated by the beam of electromagnetic radiation and the peaks of amplitude p can be located at any frequencies of the scanned frequency band $F_a$, $F_b$.

The invention, which makes use of the phenomenon discussed above, proposes, for the detection of the peaks of amplitude p and hence for the detection of an object, to illuminate the said object by a beam of electromagnetic radiation whose frequency varies discontinuously in steps over a sufficiently wide range and with a sufficiently small size of step to ensure with certainty the detection of the peaks p when carrying out the frequency scanning.

Good results were obtained by using a band of frequencies of between 8 and 18 GHz with frequency steps $\delta F$ corresponding to about half the apex value of the peaks p. However, because of the existence of a plurality of peaks p, a smaller band can be used.

Figure 2:
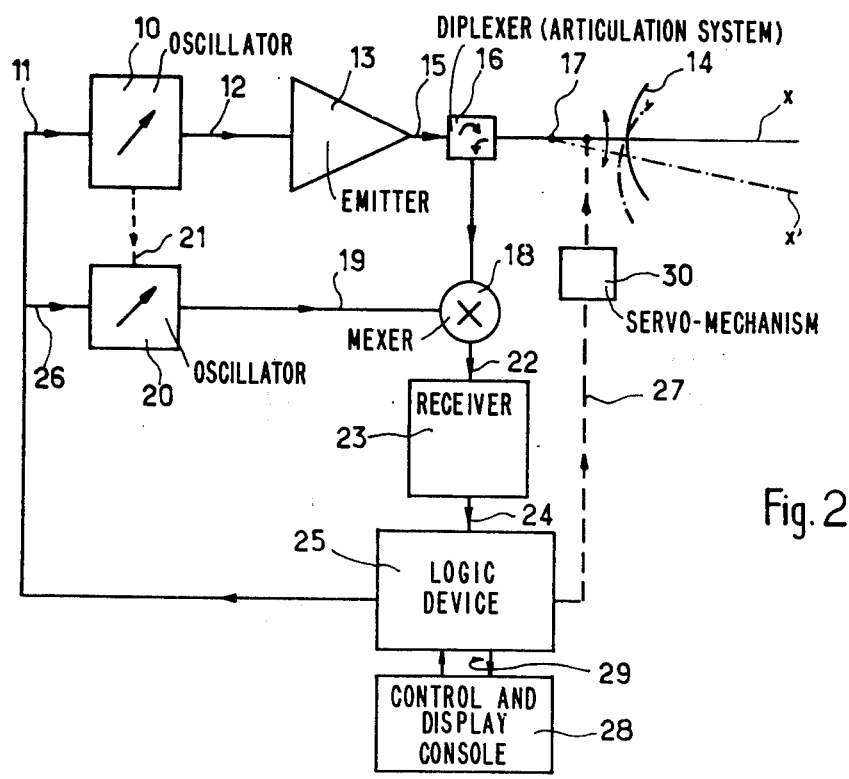
FIG. 2 is a schematic representation of apparatus according to the invention.

An embodiment of an apparatus for detecting an object, in accordance with the invention, is illustrated in FIG. 2. The apparatus comprises an oscillator 10 whose frequency can be controlled by a line 11 and whose output 12 provides a signal which, after amplification and modulation in an emitter device 13, is emitted along a beam of electromagnetic radiation of axis x by means of an antenna 14. The output 15 of the emitter device 13 is connected to the antenna 14 by a diplexer 16 and an articulation system 17 makes it possible to orient the antenna 14 in order to scan the space with the beam of electromagnetic radiation.

When the latter illuminates an object, this object reflects a part of the incident energy which, collected by the antenna 14, is directed by the diplexer 16 to a mixer 18 which receives, in a second input 19, the signal originating from an oscillator 20 appropriately tuned relative to the oscillator 10 by a control channel 21. The signal fed by the mixer 18 into the line 22 is delivered to a receiver 23 which is a receiver of the Doppler type or a pulse receiver or a receiver of the pulse-Doppler type. The output 24 of the receiver 23 forms the input of a logic device 25 which is connected to the line 11 for the control of the oscillator 10, to a line 26 for the control of the oscillator 20 and, by a line 27, in which is placed a servo-mechanism 30, to the articulation system 17, in order to control the orientation of the antenna 14, as will be explained below.

A console 28 connected to the logic circuit 25 by a double line 29 makes it possible to present in visual form the information received and/or the introduction of control instructions into the apparatus.

The mode of operation of the apparatus is as follows:

In order to search for, and detect, an object, the oscillator 10 generates a frequency $F_1$ within the band $F_a$, $F_b$ and the antenna 14 emits, along the direction x, a beam of electromagnetic radiation of the said frequency. When the amplitude of the signal collected by the antenna 14 and coming from an object is low, below a detection threshold S, FIG. 1, the said signal is not taken into account by the receiver 23 and the logic circuit 25 controls the oscillator 10, by means of the line 11, so that the said oscillator generates a frequency $F_2$ different from the frequency $F_1$.

If, for this new frequency, the amplitude of the signal coming from the object again has a low value, the logic circuit 25 controls the oscillator 10 so that the latter generates a frequency $F_3$, and so on.

The band of frequencies $F_a$, $F_b$ is broken into n steps referred to, in their sequence of use, as $F_1$, $F_{n+1}$, this sequence corresponding to increasing or decreasing frequencies or frequencies varying in any desired manner.

If, for a frequency $F_i$, the signal coming from the object is of sufficient amplitude to allow it to be processed in the receiver 23, that is to say if the amplitude of the signal received corresponds to a peak p of the curve C, the receiver 23 delivers, at its output 24, a signal which, when processed by the logic circuit 25, provides the device 28 with the indication that an object has been detected in direction x.

The logic circuit 25 then commands, by means of the servo-mechanism 30, a rotation of the antenna 14 about the articulation system 17 so as to define a new search direction x' while, by line 11, the oscillator 10 is again caused to generate the initial frequency value $F_1$.

An analogous process thereafter takes place, with the logic circuit 25 controlling, by means of the servo-mechanism 30, a fresh spatial scanning rotation of the axis of the antenna 14 if no object has been detected by the frequency scanning within the range of frequencies $F_a$-$F_b$.

The sequence of searching and detection operations is illustrated schematically in blocks with diagrams in FIG. 3, where X and Y denote two space coordinates, for example the bearing and the site of an object, with $F_i$ representing the frequency generated by the oscillator 10 and $\Delta X$ and $\Delta Y$ representing the increments of the spatial coordinates.

As seen in FIG. 3 an initial signal is supplied to the oscillator either based on a final signal (X final or Y final) produced when the previous signal exceeded a given threshold or is the last signal of a sequence of signals which did not exceed the threshold. The initial signal is emitted and the reflected signal is compared to the threshold and if it exceeds the threshold the signal is utilized and terminates the emission at the particular frequency by the particular command whereas if the signal is below the threshold, the sequence of frequencies is continued to the final frequency of the sequence and the operation is resumed for the sequence of frequencies after the antenna has been pivoted to scan a new spatial region.

A different embodiment of the apparatus described above provides that the reception by the antenna 14 of a signal of sufficient amplitude, corresponding to the detection of an object in a given direction, does not result in the search for a possible object in another direction, but triggers a change in the mode of operation of the apparatus, for example maintains the oscillator 10 on the previously set up frequency so as to undertake a pursuit of the object in order to provide more precise information relating thereto, for example in respect of its bearing, its site, its distance relative to the apparatus, its speed and so on, the search for other objects only being resumed after specific instructions to this effect.

In yet another embodiment, which can, in particular, be used to reduce the time for detecting an object in a portion of space which is being subjected to surveillance, a plurality of frequencies is generated and emitted simultaneously. If, for example, two frequencies are generated and each of them scans, in steps, half the total frequency band, the search time is substantially reduced by half.

The apparatus according to the invention, which can be carried on an aircraft or on a naval craft is particularly valuable for use in detecting objects which statistically, as a function of frequency, exhibit a very small equivalent surface area, such as is the case with objects of complex structure, for example targets or missiles.

We claim:

1. A process for detection of objects, comprising the following steps:
    emitting from an antenna having a given orientation successive beams of electromagnetic radiation starting with a beam of a first frequency, each successive beam having a different frequency chosen among a predetermined finite set of frequencies;
    detecting from said antenna electromagnetic radiation reflected by an object, said reflected radiation having a given amplitude;
    comparing said amplitude with a predetermined threshold; and
    modifying the orientation of the antenna and emitting a new beam of first frequency and said successive beams when said amplitude is greater than said threshold or when said frequency of said successive beams has completed all the frequencies of said predetermined finite set.

2. The process according to claim 1, in which, in order to reduce the search time, a plurality of beams of different frequencies are emitted simultaneously, of which each discontinuously scans a fraction of the overall frequency band of said plurality of beams.

3. An apparatus for the detection of objects, comprising:
    a variable frequency transmitter means;
    an antenna means having a controllable orientation coupled to said transmitter means for emitting beams of electromagnetic radiation and for detecting signals reflected from an object, means for controlling the orientation of said antenna means;

receiver means coupled to said antenna means for comparing the amplitude of the reflected signals with a preselected threshold value and for delivering an output signal when the amplitude of the reflected signal is greater than said threshold value; and logic means connected to said receiver means for varying said frequency in steps over a finite set of frequency values, said logic means being coupled to said means which controls the orientation of the antenna for modifying said orientation when said output signal is produced at the receiver means or at the end of the finite set of frequency values.

4. An apparatus according to claim 3 wherein said means for controlling the orientation of the antenna means comprises a servo-mechanism connected to said transmitter means and to said logic means for controlling the orientation of the antenna means.

5. The apparatus according to claim 3, in which said transmitter means comprises an oscillator means for simultaneously emitting a plurality of sets of frequencies each representing a fraction of the entire band of frequencies to be scanned.

* * * * *